J. Ashworth,
Belt Fastener.
No. 86,123. Patented Jan. 26, 1869.
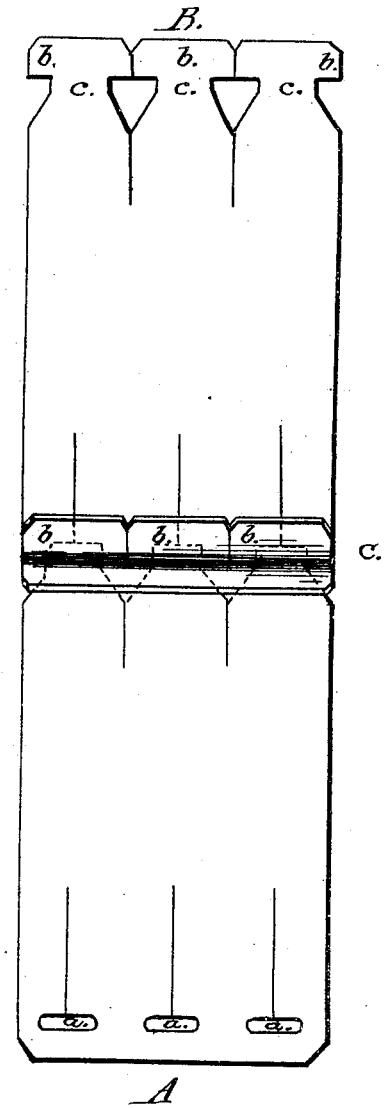
Witnesses:
S. B. Kidder
M. W. Frothingham
Inventor:
John Ashworth
by
Crosby Halsted & Gould
Attys

United States Patent Office.

JOHN ASHWORTH, OF LEWISTON, MAINE, ASSIGNOR TO HIMSELF, JOHN B. COTTON, AND ROSCOE C. REYNOLDS, OF THE SAME PLACE.

Letters Patent No. 86,123, dated January 26, 1869.

IMPROVEMENT IN JOINING OR SPLICING BELTS.

The Schedule referred to in these Letters Patent and making part of the same.

*To all whom it may concern:*

Be it known that I, JOHN ASHWORTH, a citizen of England, residing at Lewiston, in the county of Androscoggin, in the State of Maine, have invented an Improvement in the Method of Joining or Splicing Belts; and I do hereby declare that the following, taken in connection with the drawings which accompany and form part of this specification, is a description of my invention, sufficient to enable those skilled in the art to practise it.

Belts are now commonly made in considerable lengths, of such comparatively short pieces as can be cut from sides of leather, said pieces being jointed by cement, sewing, riveting, &c., into a long belt.

But where the ends of such belts are joined so as to make a continuous band, or where a belt gives out at any of the junctures of the separate pieces of which it is made, recourse is had to strips of lace-leather, and to various forms of metallic hooks or fastenings, for means of securing the adjacent detached ends of a belt to each other, so as to make the belt endless, or continuous.

My invention consists in a machine-belt, constructed to be spliced together, by making a series of tongues at one end of a joint of such a belt, by the removal of material, as illustrated in the drawings, so as to form necks, or narrow places, which necks fit in a series of spaces formed at the opposite end by removal of material therefrom.

The drawing shows in plan two pieces of belting, spliced at their adjacent ends by interlocking the material of one end with the material of the other end, in accordance with my invention, the salient ends showing the conformation which I give to each of any two ends that are to be brought together and interlocked.

In the end marked A, holes are cut or punched, as seen at *a*, and then a slit is made from each hole *a*, extending inward from the belt-end, and parallel with the belt-edges.

The belt-end, at B, is cut into what may be termed dovetails, which may be more clearly and readily understood by reference to the drawing than by means of any written description.

When the ends A and B are brought together and united, the interlocking is similar to that shown at C, in the centre of the drawing.

Each dovetail is twisted about ninety degrees, and the slits leading from the holes *a* are opened, and the heads *b* of the dovetails are pushed through the opened slits.

The heads *b* are then twisted back to their normal position, and the necks *c*, of the dovetails, then rest in the holes *a*, and the coupling or splicing of the belt-ends is effected.

To uncouple the belt-ends, twist the heads *b* ninety degrees, and open the slits from the holes, and draw the heads *b* through the slits.

This method of splicing gives a fair inner bearing-surface to the belt, and has been found, in practice, to be strong and reliable.

The only tool absolutely necessary for preparing belt-ends to be coupled, as described, is a knife; but where, as in a factory, there are many belts used, punches or cutters may be employed to make the holes *a*, and the slits therefrom, after the manner of cutting button-holes, and suitable cutters may be made, to make the cuts forming the dovetails.

I claim a machine-belt, made or arranged to be spliced as and for the purpose described.

JOHN ASHWORTH.

Witnesses:
T. A. D. FESSENDEN,
JOHN B. CATTON.